US012502280B2

(12) United States Patent
Hino et al.

(10) Patent No.: US 12,502,280 B2
(45) Date of Patent: Dec. 23, 2025

(54) ARTIFICIAL KNEE JOINT, AND BRIDGE MEMBER, INSERT MEMBER AND BASE PLATE USED THEREIN

(71) Applicant: National University Corporation Ehime University, Ehime (JP)

(72) Inventors: Kazunori Hino, Ehime (JP); Hiromasa Miura, Ehime (JP); Kunihiko Watamori, Ehime (JP); Yoshitaka Shiraishi, Ehime (JP); Tomofumi Kinoshita, Ehime (JP)

(73) Assignee: National University Corporation Ehime University, Ehime (JP)

( * ) Notice: Subject to any disclaimer, the term of this patent is extended or adjusted under 35 U.S.C. 154(b) by 840 days.

(21) Appl. No.: 17/754,744

(22) PCT Filed: Oct. 8, 2020

(86) PCT No.: PCT/JP2020/038120
§ 371 (c)(1),
(2) Date: Apr. 11, 2022

(87) PCT Pub. No.: WO2021/070904
PCT Pub. Date: Apr. 15, 2021

(65) Prior Publication Data
US 2024/0082009 A1 Mar. 14, 2024

(30) Foreign Application Priority Data
Oct. 10, 2019 (JP) .................. 2019-186944

(51) Int. Cl.
*A61F 2/38* (2006.01)
*A61F 2/30* (2006.01)

(52) U.S. Cl.
CPC .......... *A61F 2/389* (2013.01); *A61F 2/30749* (2013.01); *A61F 2/30756* (2013.01);
(Continued)

(58) Field of Classification Search
CPC .............. A61F 2/389; A61F 2002/3895; A61F 2/30749; A61F 2002/30116;
(Continued)

(56) References Cited

U.S. PATENT DOCUMENTS

| 5,092,895 A | 3/1992 | Albrektsson et al. |
| 5,344,458 A | 9/1994 | Bonutti |

(Continued)

FOREIGN PATENT DOCUMENTS

| CN | 109620477 A | * | 4/2019 | ............. A61F 2/389 |
| EP | 1426013 A1 | | 6/2004 | |

(Continued)

OTHER PUBLICATIONS

Official Action (including English translation) issued in corresponding Japanese patent application No. 2021-551701 mailed Aug. 6, 2024.

(Continued)

*Primary Examiner* — Javier G Blanco
(74) *Attorney, Agent, or Firm* — Norton Rose Fulbright US LLP

(57) ABSTRACT

An artificial knee joint 1 includes: an insert member 2 embedded in a part of a joint surface of a medial condyle MC or lateral condyle LC of a tibia T; and a bridge member 3 disposed underneath the insert member 2, and having a length that allows both ends thereof to be anchored to a cortical bone of a tibia T.

8 Claims, 18 Drawing Sheets

(52) U.S. Cl.
CPC ............... *A61F 2002/30116* (2013.01); *A61F 2002/30125* (2013.01); *A61F 2002/30156* (2013.01); *A61F 2002/30225* (2013.01); *A61F 2002/30235* (2013.01); *A61F 2002/30841* (2013.01); *A61F 2002/30884* (2013.01); *A61F 2002/3895* (2013.01)

(58) Field of Classification Search
CPC .. A61F 2002/30125; A61F 2002/30225; A61F 2002/30113; A61F 2002/30115; A61F 2002/30187
See application file for complete search history.

(56) References Cited

U.S. PATENT DOCUMENTS

| | | | |
|---|---|---|---|
| 6,620,199 | B2 | 9/2003 | Grelsamer |
| 6,755,864 | B1 | 6/2004 | Brack et al. |
| 2002/0068979 | A1 | 6/2002 | Brown et al. |
| 2004/0106928 | A1 | 6/2004 | Ek |
| 2010/0286788 | A1 | 11/2010 | Komistek |
| 2014/0156017 | A1* | 6/2014 | Salyer ................ A61F 2/30749 623/20.34 |
| 2017/0333193 | A1 | 11/2017 | Miura et al. |
| 2020/0383795 | A1 | 12/2020 | Zhu et al. |

FOREIGN PATENT DOCUMENTS

| | | | | |
|---|---|---|---|---|
| FR | 2630640 A1 | * | 11/1989 | ............... A61F 2/38 |
| JP | H5-208029 A | | 8/1993 | |
| JP | 2001/120583 A | | 5/2001 | |
| JP | 2006/518615 A | | 8/2006 | |
| JP | 2013/172992 A | | 9/2013 | |
| JP | 2018/502651 A | | 2/2018 | |
| WO | 2004/075777 A2 | | 9/2004 | |
| WO | WO 2016068340 | | 5/2016 | |
| WO | 2016/118753 A2 | | 7/2016 | |
| WO | 2019/007290 A1 | | 1/2019 | |

OTHER PUBLICATIONS

Supplemental European Search Report dated Oct. 20, 2022, issued during examination of related European Application No. 20874944.0.

Official Action (including English translation) issued in corresponding Chinese patent application No. 202080068239.6 mailed Mar. 1, 2025.

International Search Report dated Dec. 28, 2020, during examination of International Application No. PCT/JP2020/038120.

Office Action issued in corresponding Japanese Application No. 2021551701, dated Mar. 29, 2024.

Official Action (including English translation) issued in corresponding Chinese patent application No. 202080068239.6 mailed Aug. 30, 2025.

Official Action (including English translation) issued in corresponding Indian patent application No. 202247024188 mailed Oct. 30, 2025.

* cited by examiner (a)

(b)

(c)

(a)

(b)

(c)

(d)

ARTIFICIAL KNEE JOINT, AND BRIDGE MEMBER, INSERT MEMBER AND BASE PLATE USED THEREIN

CROSS-REFERENCE TO RELATED APPLICATIONS

This application is a national phase application under 35 U.S.C. § 371 that claims priority to International Application No. PCT/JP2020/038120 filed Oct. 8, 2020, which claims priority to Japan Patent Application No. 2019-186944 filed Oct. 10, 2019, both of which are incorporated herein by reference in their entirety.

TECHNICAL FIELD

The present invention relates to an artificial knee joint, and to a bridge member, an insert member and a base plate, which are used therein.

BACKGROUND ART

A knee joint is a joint formed of a femur, a tibia, and a patella. In the knee joint, joint cartilages of a distal end of the femur and of a proximal end of the tibia and a meniscus present therebetween function as cushions, whereby the knee joint can move smoothly.

However, when such knee cartilages wear and the meniscus is damaged due to fatness, aging and the like, not only cushioning between the distal end of the femur and the proximal end of the tibia is lost, but also deformation of the knee joint occurs and progresses with the elapse of time. Further, also when rheumatoid arthritis develops, the knee is injured, and so on, the knee joint is deformed. When the knee joint is thus deformed (causes knee osteoarthritis), the knee joint is disabled to move smoothly, and a patient feels a severe pain when walking and so on, and further, sometimes has difficulty walking.

As a treatment for such knee osteoarthritis, total knee arthroplasty (TKA) is adopted. This total knee arthroplasty is a technique for resecting the distal end of the femur and the proximal end of the tibia and replacing such resected portions by an artificial knee joint. A large number of patients undergo the total knee arthroplasty at present. The total knee arthroplasty has effects that the pain can be removed, that the patients are enabled to walk usually, and the like, and gives a high satisfaction to the patients. Further, a large number of artificial knee joints for use in the total knee arthroplasty are also developed (refer to Patent Documents 1 and 2).

Moreover, in recent years, there has also been adopted unicompartmental knee arthroplasty (UKA) that replaces only a part of a knee joint by an artificial knee joint. In Patent Document 3 that follows, a partial unicompartmental system for the unicompartmental knee arthroplasty is disclosed.

PRIOR ART DOCUMENTS

Patent Documents

Patent Document 1: JP-A-2013-172992
Patent Document 2: JP-A-2001-120583
Patent Document 3: JP-A-2018-502651

SUMMARY OF THE INVENTION

Problems to be Solved by the Invention

However, in the current total knee arthroplasty and the current the unicompartmental knee arthroplasty, the meniscus cannot be preserved in principle. Further, in the total knee arthroplasty, a joint surface is entirely cut out and replaced by the artificial knee joint, and therefore, it is difficult to reproduce a height of the original joint surface. The height of the original joint surface changes, whereby many reports on unexpected pains and on limitations of a movable range are made after surgeries, and the patients have not been fully satisfied.

In this connection, it is an object of the present invention to provide an artificial knee joint capable of acquiring characteristics closer to those of a normal knee joint, and to provide a bridge member, an insert member and a base plate, which are used therein.

Means for Solving the Problems

An artificial knee joint according to the present invention includes: an insert member embedded in a part of a joint surface of a medial condyle or lateral condyle of a tibia; and a bridge member disposed underneath the insert member, and having a length that allows both ends of the bridge member to be anchored to a cortical bone of the tibia.

With this configuration, the insert member is embedded in only a part of the joint surface, whereby a surface of the insert member can be matched with a joint surface that has remained therearound, and therefore, it is possible to reproduce a height of an original joint surface. Moreover, the height of the original joint surface is reproduced, thus making it possible to preserve a meniscus. As a result, in accordance with the artificial knee joint according to the present invention, the characteristics closer to those of the normal knee joint can be acquired.

MODE FOR CARRYING OUT THE INVENTION

An artificial knee joint according to an embodiment of the present invention will be described below with reference to the drawings. The artificial knee joint according to the present invention is an artificial knee joint for use in total knee joint replacement in a treatment for knee osteoarthritis, rheumatoid arthritis and the like, characterized in adopting a structure capable of preserving a meniscus and a ligament.

[Artificial Knee Joint]

Figure 1:
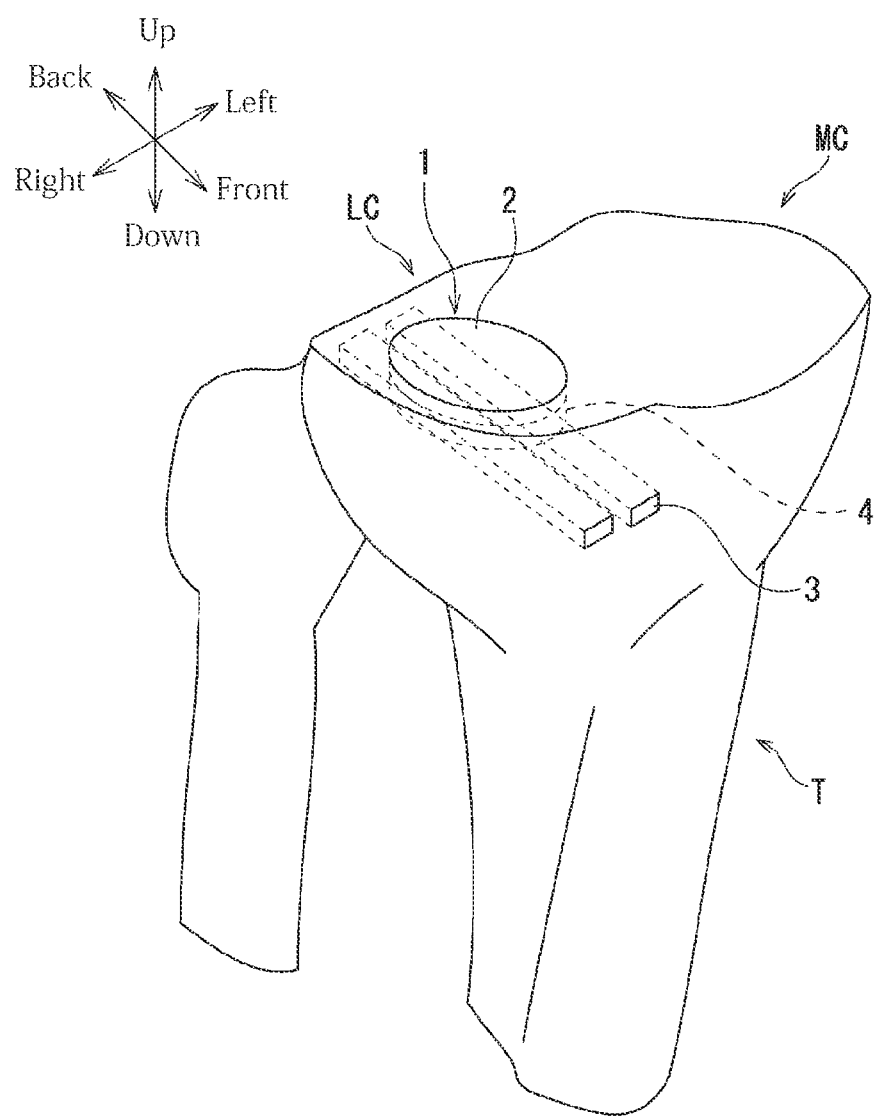
FIG. 1 is a perspective view illustrating a use state of an artificial knee joint.
Figure 2:
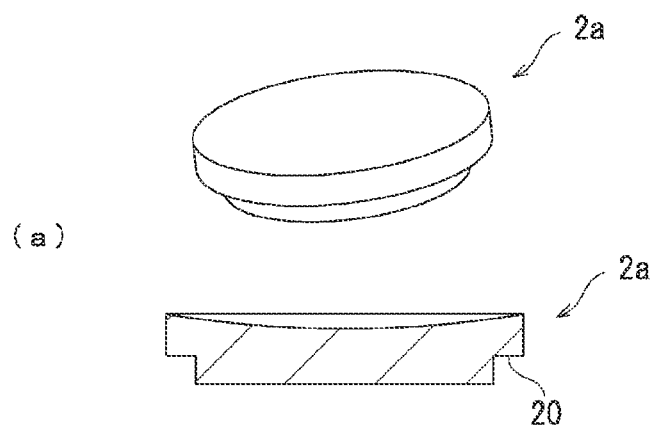
FIGS. 2(a), 2(b), and 2(c) are perspective and cross-sectional views illustrating insert members.
Figure 2:
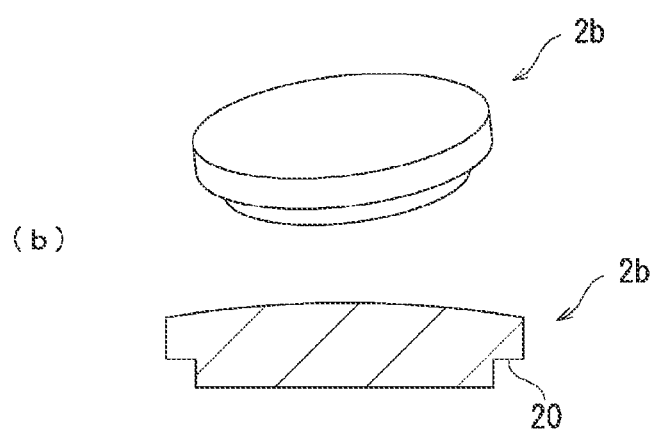
Figure 2:
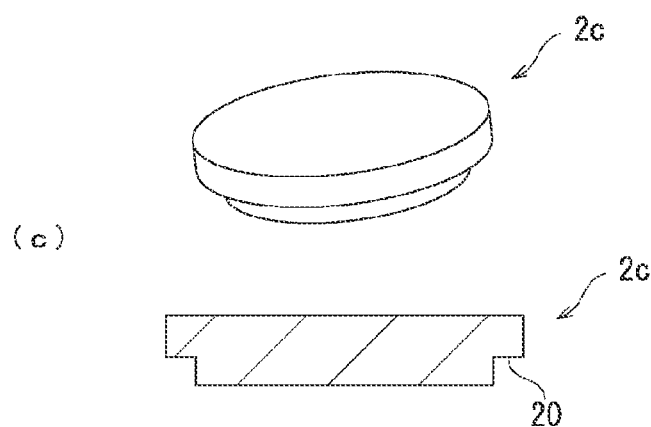
Figure 3:
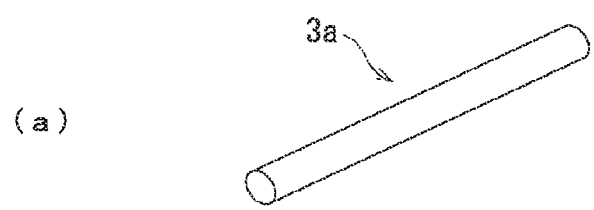
FIGS. 3(a), 3(b), and 3(c) are perspective views illustrating bridge members.
Figure 3:
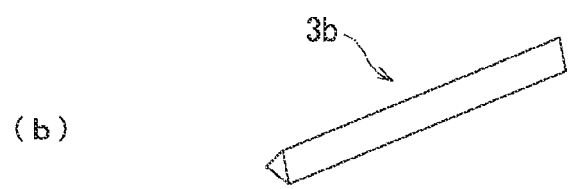
Figure 3:
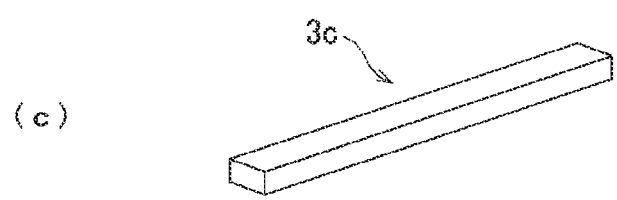

FIG. 1 illustrates a use state of an artificial knee joint 1. FIGS. 2 to 4 illustrate constituent members of the artificial knee joint 1. In the following description of the artificial knee joint 1, a direction where a tibia T extends will be referred to as an up-down direction, and a front-rear direction and left-right direction of a patient in the tibia Twill be referred to as a front-rear direction and a left-right direction, respectively.

The artificial knee joint 1 includes: an insert member 2 embedded in a part of a joint surface of a medial condyle MC or lateral condyle LC of the tibia T; and bridge members 3 disposed underneath the insert member 2. The artificial knee joint 1 may further include a base plate 4 disposed between the insert member 2 and the bridge members 3. In FIG. 1, the insert member 2 is embedded in a part of a joint surface of the lateral condyle LC.

A part of the joint surface of the medial condyle MC or lateral condyle LC of the tibia T, specifically, a damaged portion (or worn portion) of the joint surface is resected, and the insert member 2 is embedded in a portion subjected to the resection. The insert member 2 is embedded while a height and surface shape thereof are being adjusted so that a surface of the insert member 2 smoothly connects to such a surrounding original joint surface.

Preferably, plural types of the insert member 2 are prepared, and FIGS. 2(a), 2(b), and 2(c) illustrate insert members 2(a) to 2(c) different in shape. FIGS. 2(a), 2(b), and 2(c) illustrate perspective and cross-sectional views of the insert members 2a to 2c.

The insert members 2a to 2c have a disk shape as a whole. The insert member 2a is embedded in the medial condyle MC of the tibia T, and has a surface formed into a recessed curved surface. The insert member 2b is embedded in the lateral condyle LC of the tibia T, and has a surface formed into a protruding curved surface. Further, the insert member 2c has a surface formed into a flat surface.

On a lower surface of each of the insert members 2a to 2c, a concentric step portion 20 to which an upper end portion of the cylindrical base plate 4 is fitted is formed. Note that, when the base plate 4 is not provided, the step portion 20 is not formed.

A diameter of each of the insert members 2a to 2c is, for example, 15 to 25 mm, preferably 17 to 22 mm. Actually, a plurality of the insert members 2a to 2c different in diameter are prepared in advance, and the optimal-size insert members 2a to 2c are selected while referring to a patient's image of MRI or the like.

A thickness of the insert members 2a to 2c is, for example, 4 mm or more. With regard to the insert members 2a to 2c, a plurality of the insert members 2a to 2c different in thickness are prepared in advance, and the optimal-thickness insert members 2a to 2c are selected while referring to the patient's image of MRI or the like. Thus, a height of the surface of each of the insert members 2a to 2c can be matched with a height of the original joint surface.

Further, a recess of the insert member 2a embedded in the medial condyle MC is, for example, 1 to 2 mm, and a swell of the insert member 2b embedded in the lateral condyle LC is, for example, 1 to 2 mm. The surface of each of the insert members 2a to 2c is formed so as to smoothly connect to the original joint surface around the embedded portion of each.

The insert members 2a to 2c are composed of a material (for example, polymer polyethylene or the like) having high slipperiness and wear resistance.

The bridge members 3 are disposed below the insert member 2 along a substantially horizontal direction, and support the insert member 2 from below. The bridge members 3 which function as rafts in such a way are sometimes referred to as raft pins. Note that the bridge members 3 do not always have to come into contact with a lower surface of the insert member 2. That is, the bridge members 3 may support the insert member 2 with a spongy bone in the tibia T interposed therebetween without coming into contact with the lower surface of the insert member 2.

A shape of the bridge member 3 is not particularly limited, and FIGS. 3(a), 3(b), and 3(c) illustrate bridge members 3a to 3c different in shape. FIGS. 3(a), 3(b), and 3(c) illustrate perspective views of the bridge members 3a to 3c.

The bridge members 3a to 3c are rod-shaped members, and have a length that allows both ends thereof in a longitudinal direction to be anchored to a cortical bone of the tibia t. Thus, each of the bridge members 3a to 3c becomes a both-end fixed bridge in which both ends are fixed to the hard cortical bone. A length of the bridge members 3a to 3c is, for example, 30 to 80 mm. Actually, a plurality of the bridge members 3a to 3c different in length are prepared in advance, a depth of holes into which the bridge members 3a to 3c are inserted is measured by a depth gauge at the time of surgery, and the optimal-length bridge members 3a to 3c are selected. The bridge members 3a to 3c are prepared at, for example, 2-mm pitch, preferably 1-mm pitch. Moreover, a width of the bridge members 3a to 3c is, for example, 2 to 8 mm.

A cross-sectional shape of the bridge members 3 is not particularly limited. A cross section of the bridge member 3a is circular. However, the cross section of the bridge member 3a may be elliptical.

A cross section of the bridge member 3b is triangular. In a use state, the bridge member 3b may be disposed so as to point a vertex of the triangle upward as illustrated in FIG. 3(b), but may be disposed so as to point a bottom of the triangle upward to form an inverted triangular cross section. The bridge member 3b is disposed so as to point the bottom of the triangle upward, whereby the function to support the insert member 2 increases.

A cross section of the bridge member 3c is quadrangular. Herein, the quadrangle is a concept that includes, a square, a trapezoid, a rhombus, and the like, as well as the rectangle illustrated in FIG. 3(c).

The bridge member 3a that has a circular cross section has a simple shape; however, considering strength, the bridge member 3b that has a triangular cross section and the bridge member 3c that has a quadrangular cross section are preferable. Moreover, the bridge member 3b or the bridge member 3c may be driven into a circular through hole drilled by a drill or the like.

The bridge members 3a to 3c are composed of a material (for example, titanium, stainless steel and the like) that has high biocompatibility and high rigidity.

The base plate 4 is disposed between the insert member 2 and the bridge members 3. The base plate 4 has a cylindrical shape, is fitted to the step portion 20 formed on the lower surface of the insert member 2, and supports an outer edge of the insert member 2 from below. A wall thickness of the cylindrical base plate 4 is, for example, 1 mm.

As the base plate 4, a plurality of those different in height may be prepared. Thus, at the time of adjusting the height of the insert member 2, the height can be adjusted not only by the insert member 2 itself but also by the base plate 4. Further, a height adjusting plate (not shown) may be disposed separately between the base plate 4 and the bridge members 3.

The base plate 4 does not always have to come into contact with the bridge members 3. That is, the base plate 4 may allow the spongy bone of the tibia T to be interposed between the same and the bridge members 3 without coming into contact with the bridge members 3.

Figure 4A:
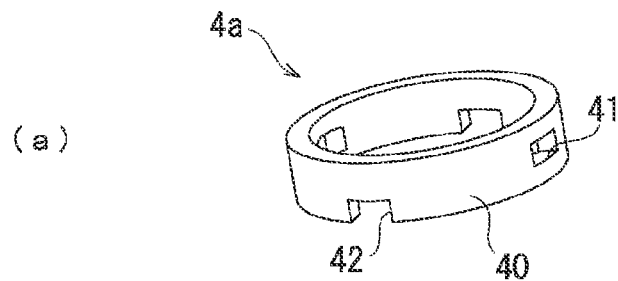
FIGS. 4A(a), 4A(b), 4A(c), and 4A(d) are a perspective view illustrating base plates.
Figure 4A:
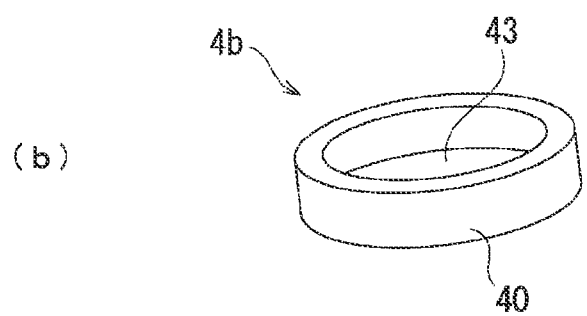
Figure 4A:
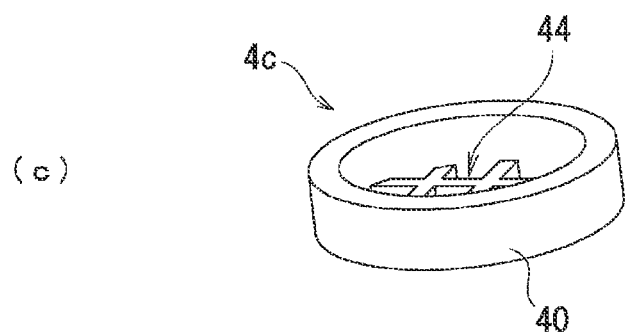
Figure 4A:
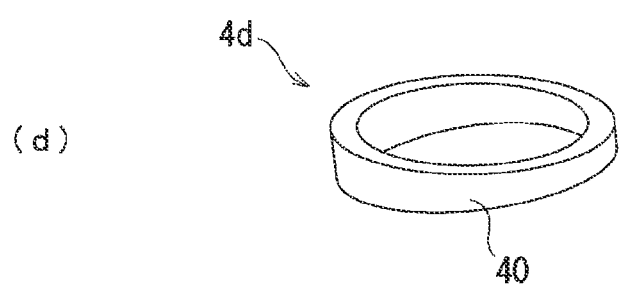
Figure 4B:
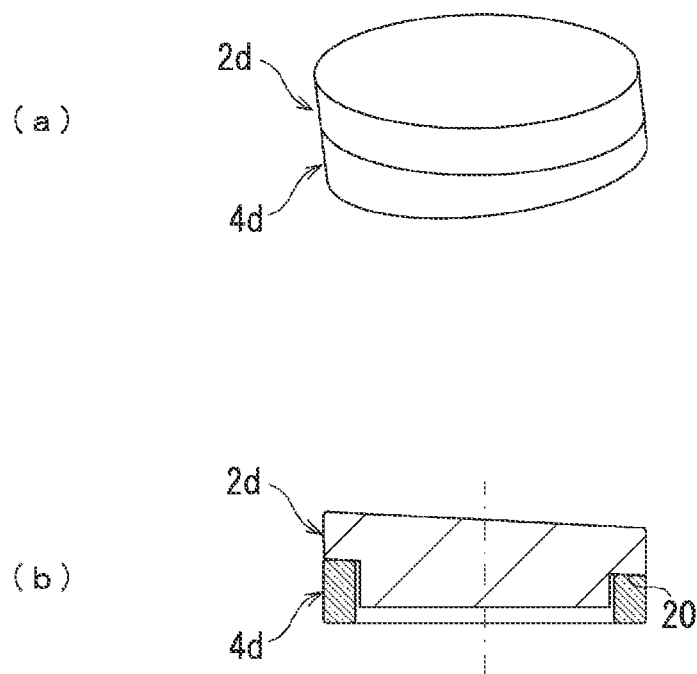
FIGS. 4B(a) and 4B(b) are perspective and cross-sectional views illustrating a use state of a base plate according to another embodiment.

A shape of the base plate 4 is not particularly limited, and FIGS. 4A(a), 4A(b), 4A(c), ad 4A(d) illustrate base plates 4a to 4d different in shape. FIGS. 4A(a), 4A(b), 4A(c), and 4A(d) illustrate perspective views of the base plates 4a to 4d. FIG. 4B(a) and 4B(b) are perspective and cross-sectional views illustrating a use state of the base plate 4d.

In a cylindrical portion 40 of the base plate 4a, fixing holes 41 and fixing grooves 42, to which two bridge members 3c which have a quadrangular cross section are fitted, are formed. Two bridge members 3c are arranged in a cross shape. The base plate 4a and the bridge members 3c are combined with each other, whereby the base plate 4a and the bridge members 3c are integrated with each other. Therefore, the function to support the insert member 2 increases.

The base plate 4b has a bottomed cylindrical shape that has the cylindrical portion 40 and a bottom portion 43. With such a configuration, the insert member 2 can be prevented from sinking when a large load is applied thereto.

The base plate 4c has a lattice-shaped mesh portion 44 formed in a lower opening of the cylindrical portion 40. With this configuration, the mesh portion 44 can prevent the base plate 4c from sinking, and in addition, can reinforce the cylindrical portion 40 to maintain the cylindrical shape thereof. Further, a footprint of the base plate 4c is increased by the mesh portion 44, whereby there increases such a function to support the base plate 4c by cement installation.

The base plate 4d is composed so that an upper end surface of the cylindrical portion 40 is inclined with respect to a plane perpendicular to a cylinder axis of the cylindrical portion 40. Meanwhile, a lower end surface of the cylindrical portion 40 is parallel to the plane perpendicular to the cylinder axis. That is, the upper end surface of the base plate 4d is formed diagonal with respect to the lower end surface thereof. The base plate 4d is used in combination with an insert member 2d illustrated in FIGS. 4B(a) and 4B(b). Like the upper end surface of the base plate 4d, an upper surface of the insert member 2d is formed so as to be inclined with respect to the plane perpendicular to the cylinder axis of the base plate 4d. Further, a step portion 20 of the insert member 2d is parallel to the upper surface. With this configuration, the base plate 4d is rotated about the cylinder axis, whereby a height of the insert member 2d can be adjusted according to the height and shape of the joint surface of the actual tibia T. At this time, in order that the insert member 2d cannot rotate with respect to the base plate 4d, mutual contact surfaces of the step portion 20 of the insert member 2d and the upper end surface of the base plate 4d may be provided with protrusions and grooves fitted to this protrusion. A shape and number of the protrusions are not particularly limited, and for example, the protrusions may be at least one point protrusion, a plurality of linear protrusions which extend radially from the cylinder axis taken as a center.

FIGS. 4C to 4L illustrate base plates 4 according to other embodiments. The base plate 4 may include the cylindrical portion 40 (an example of a tubular portion) and protruding portions which protrude outward from an outer circumferential surface of the cylindrical portion 40. The protruding portions are provided on the outer circumferential surface of the cylindrical portion 40, and can thereby suppress the base plate 4 from sinking.

Figure 4C:
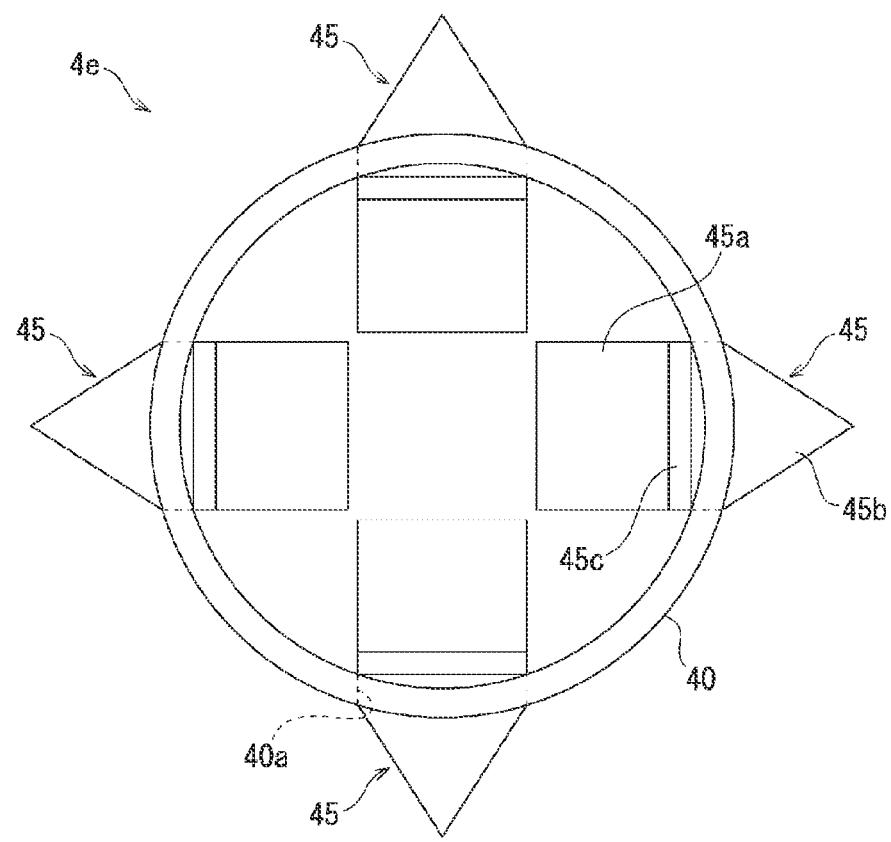
Figure 4C:
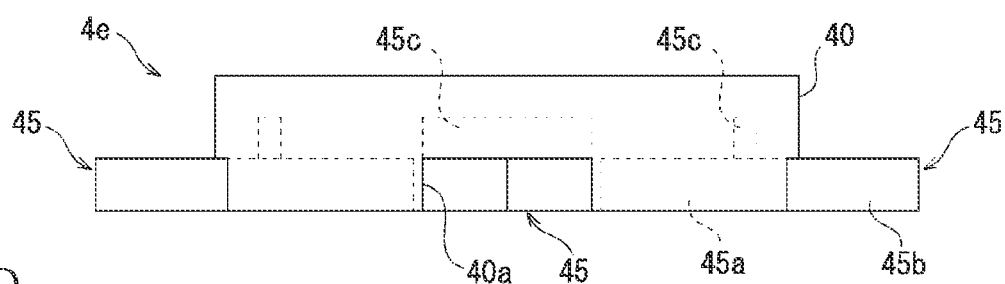
Figure 4D:
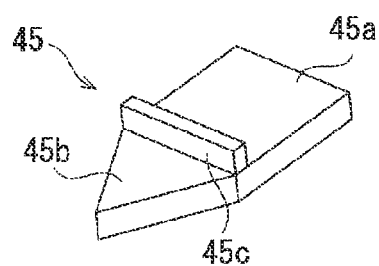
Figure 4:
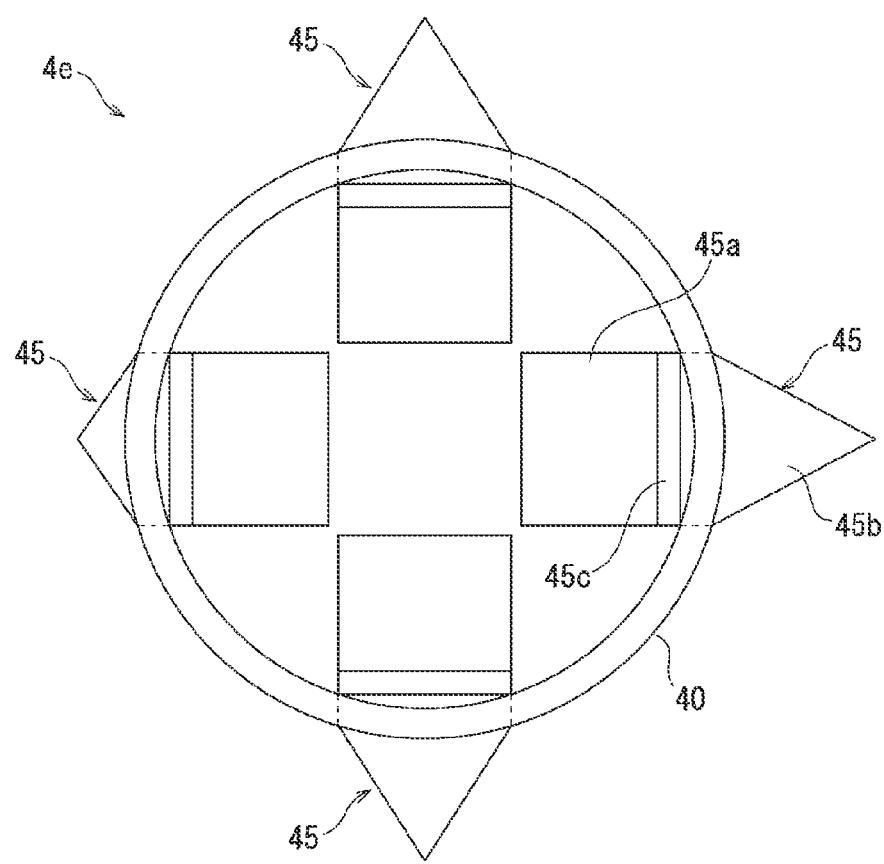

FIG. 4C is plan and side views of the base plate 4e, and FIG. 4D illustrates a perspective view of each of fins 45. The base plate 4e has the fins 45 provided on the cylindrical portion 40. The fins 45 of which number is four are provided on a circumferential direction of the cylindrical portion 40. The fins 45 are plate-shaped members formed of the same material as that of the cylindrical portion 40. Each of the fins 45 has a rectangular portion 45a and a triangular portion 45b. Apart of the triangular portion 45b protrudes outward from the outer circumferential surface of the cylindrical portion 40. The triangular portion 45b has a sharp tip end so to easily enter the spongy bone.

The cylindrical portion 40 has opening portions 40a which allow a tube inside and a tube outside to communicate with each other. A width of the opening portions 40a is slightly wider than a width of the rectangular portions 45a of the fins 45. Thus, the fins 45 can be protruded from the cylinder inside to the cylinder outside through the opening portions 40a. Further, each of the fins 45 may have a stopper 45c that restricts a protrusion amount thereof from the outer circumferential surface of the cylindrical portion 40. Such stoppers 45c restrict the fins 45 from moving by coming into contact with an inner circumferential surface of the cylindrical portion 40.

Moreover, as illustrated in FIG. 4E, the respective fins 45 are differentiated in shape from one another, whereby the protrusion amounts of the triangular portions 45b which protrude from the outer circumferential surface of the cylindrical portion 40 may be changed. For example, the protrusion amount of the triangular portion 45b may be decreased at a place close to the cortical bone, and the protrusion amount of the triangular portion 45b may be increased at a place distant from the cortical bone.

Figure 4F:
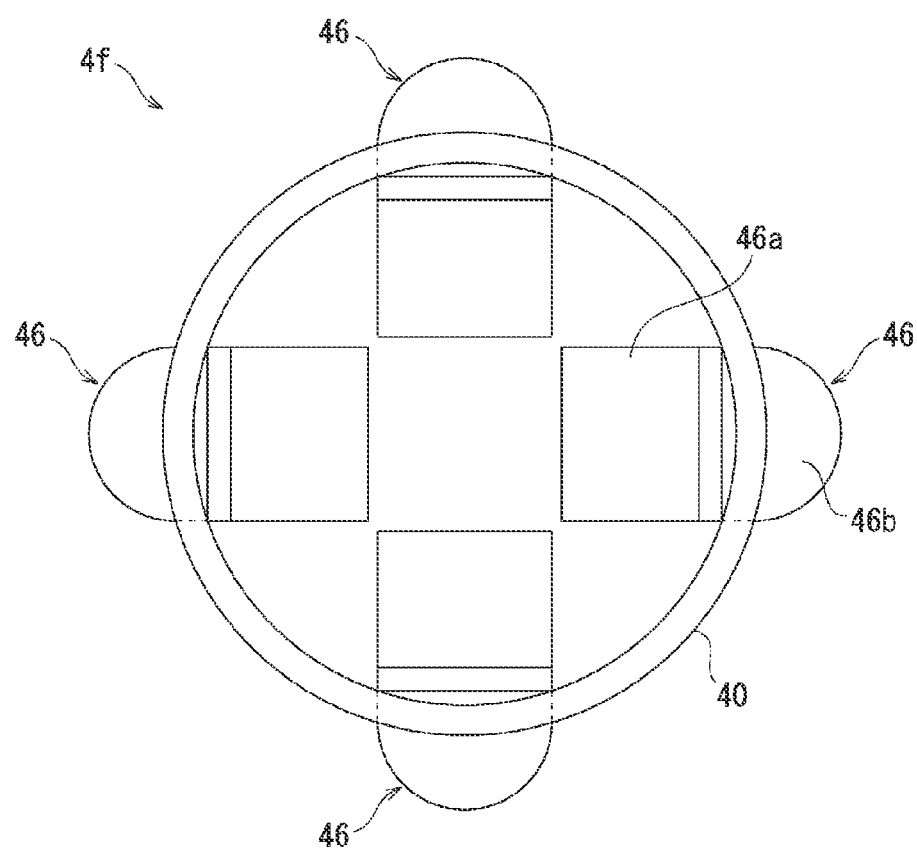

FIG. 4F illustrates a plan view of a base plate 4f. The base plate 4f has four fins 46 provided on the cylindrical portion 40. Each of the fins 46 has a rectangular portion 46a and a semicircular portion 46b. A part of the semicircular portion 46b protrudes outward from the outer circumferential surface of the cylindrical portion 40.

Figure 4G:
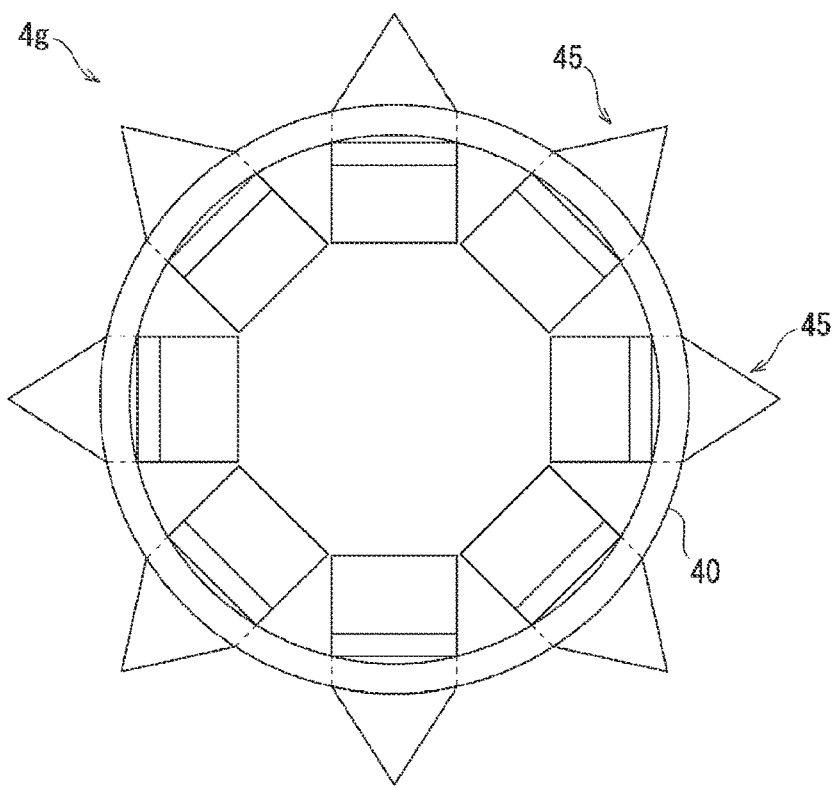

FIG. 4G illustrates a plan view of a base plate 4g. The base plate 4g has eight fins 45 provided on the cylindrical portion 40. Note that the number of fins 45 thus provided is not particularly limited; however, is preferably three or more.

Figure 4H:
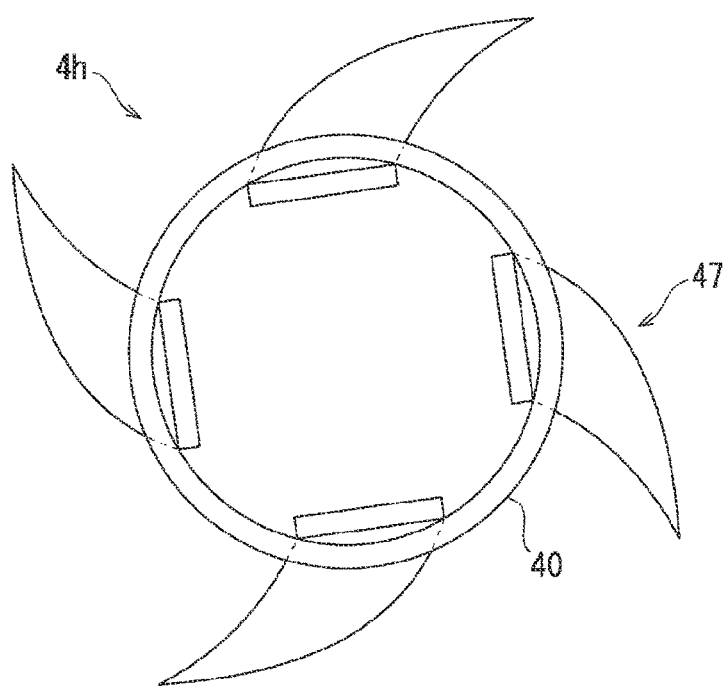

FIG. 4H illustrates a plan view of a base plate 4h. The base plate 4h has four fins 47 provided on the cylindrical portion 40. The fins 47 extend in directions inclined in a circumferential direction with respect to normal directions of the outer circumferential surface of the cylindrical portion 40.

Figure 4I:
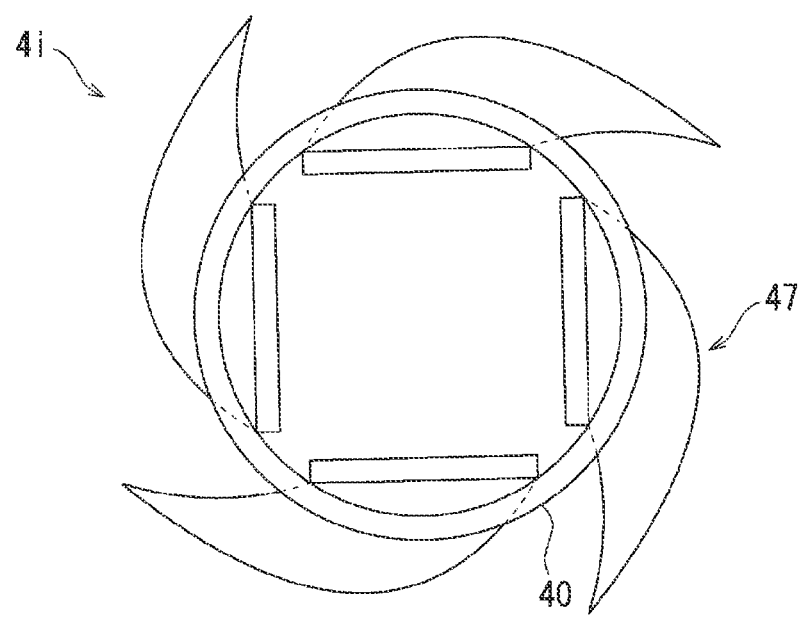

FIG. 4I illustrates a plan view of a base plate 4i. The base plate 4i has fins 47 extending in directions different from those of the base plate 4h illustrated in FIG. 4H.

Figure 4J:
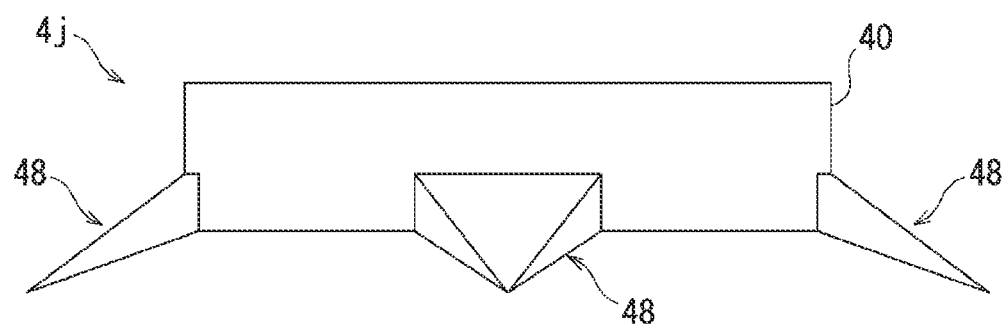

FIG. 4J illustrates a side view of a base plate 4j. The base plate 4j has fins 48 extending diagonally downward from the outer circumferential surface of the cylindrical portion 40.

Figure 4K:
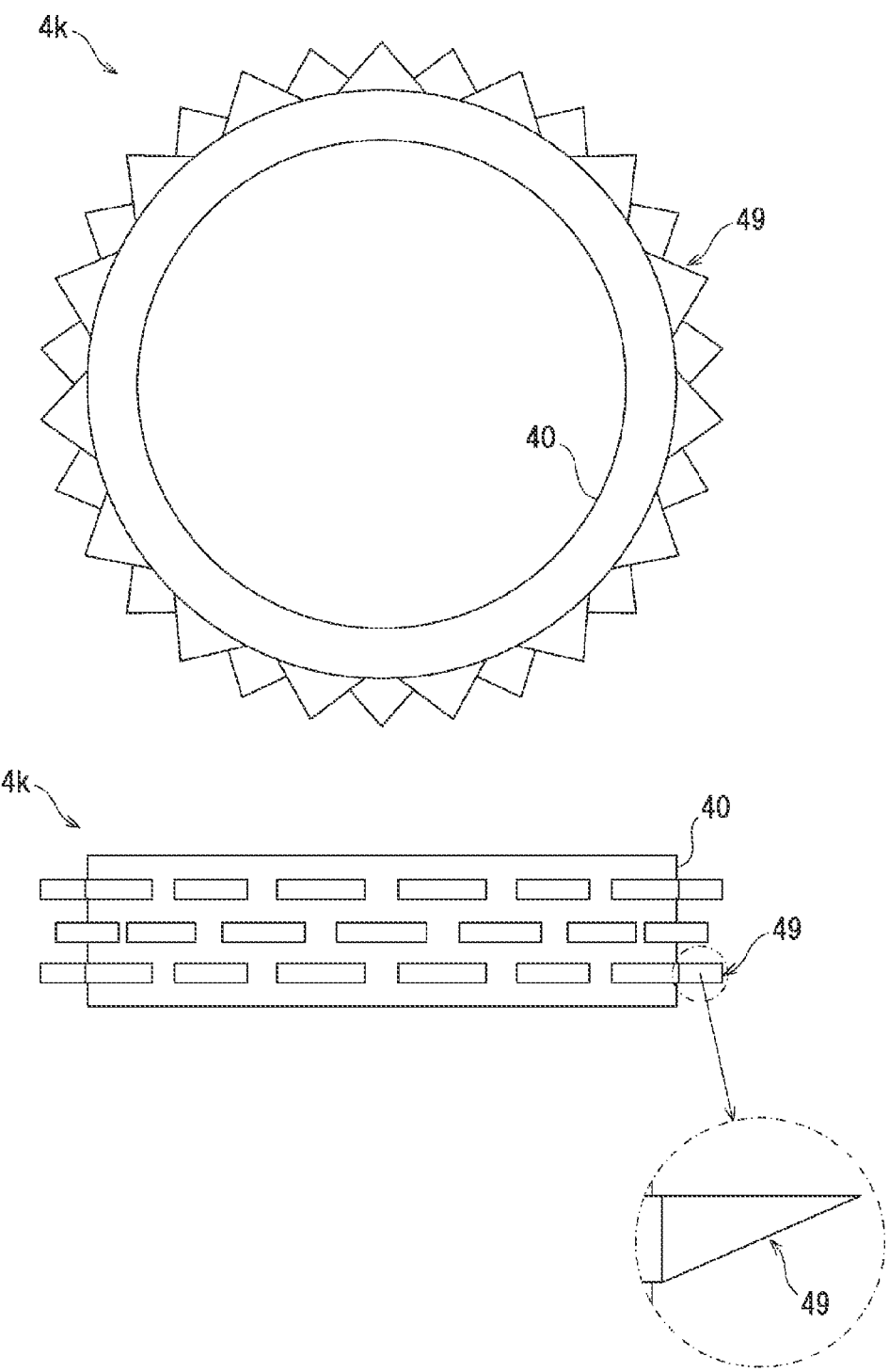
Figure 4:
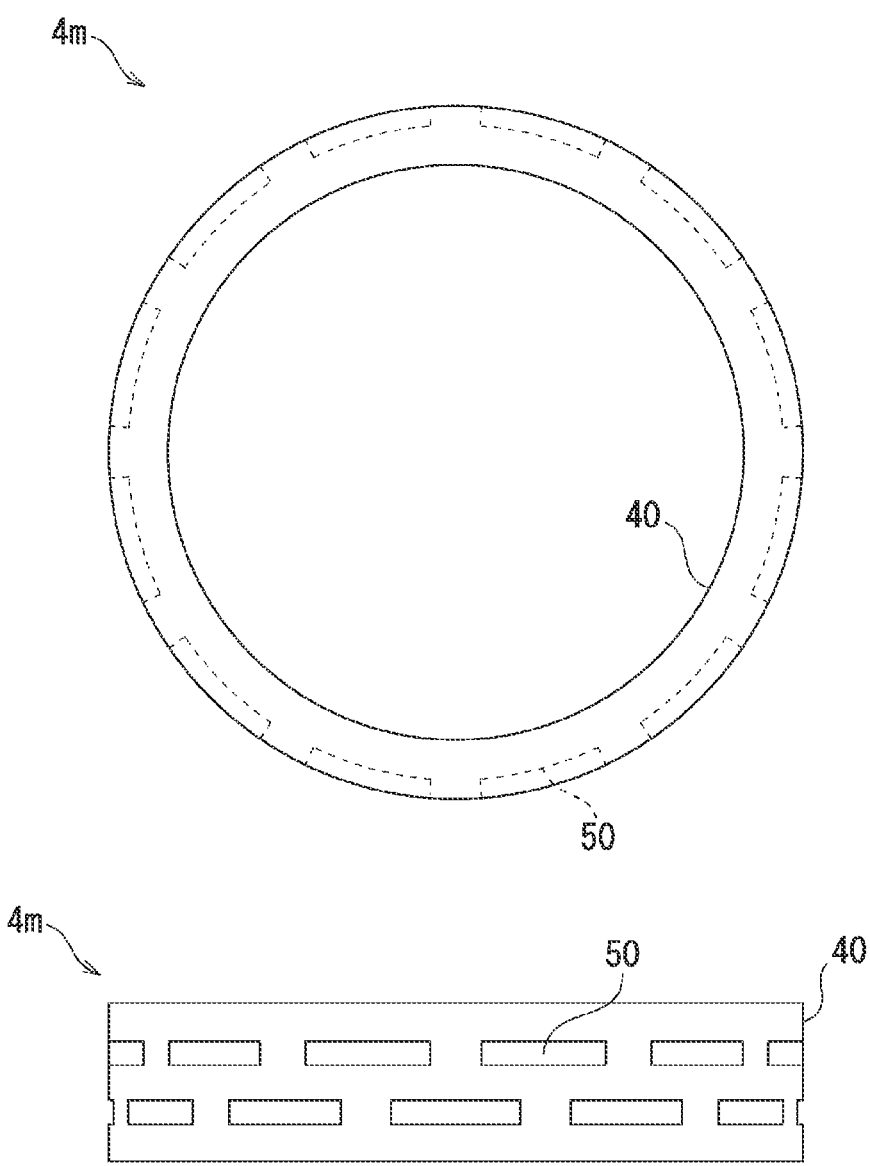

A base plate 4k illustrated in FIG. 4K has threads 49 provided on the outer circumferential surface of the cylindrical portion 40. The threads 49 are intermittently provided in the circumferential direction along the outer circumferential surface of the cylindrical portion 40. Moreover, the threads 49 are provided in a plurality of rows in the up-down direction. Note that, though the threads 49 may be intermittently provided in the circumferential direction along the outer circumferential surface of the cylindrical portion 40, the threads 49 may be provided on the entire outer circumferential surface of the cylindrical portion 40. Preferably, the threads 49 have lower surfaces inclined upward toward tip ends thereof so as to easily drive the base plate 4k into the tibia when the base plate 4k is driven thereinto (see an enlarged view).

A base plate 4m illustrated in FIG. 4L has recessed portions 50 provided on the outer circumferential surface of the cylindrical portion 40. The recessed portions 50 are intermittently provided in the circumferential direction along the outer circumferential surface of the cylindrical portion 40. Moreover, the recessed portions 50 are provided in a plurality of rows in the up-down direction. With an elapse of time, the spongy bone enters the recessed portions 50, whereby the base plate 4m is suppressed from sinking. Note that, though the recessed portions 50 may be intermittently provided in the circumferential direction along the outer circumferential surface of the cylindrical portion 40, the recessed portions 50 may be provided on the entire outer circumferential surface of the cylindrical portion 40.

Note that, though each of the cylindrical portions 40 illustrated in FIGS. 4C to 4L has a cylindrical shape with open upper and lower portions, the cylindrical portion 40 may have a form in which the bottom portion 43 as illustrated in FIG. 4A (b) is provided, or may have a form in which the lattice-shaped mesh portion 44 as illustrated in FIG. 4A (c) is provided.

[Surgery Procedure]

Figure 5:
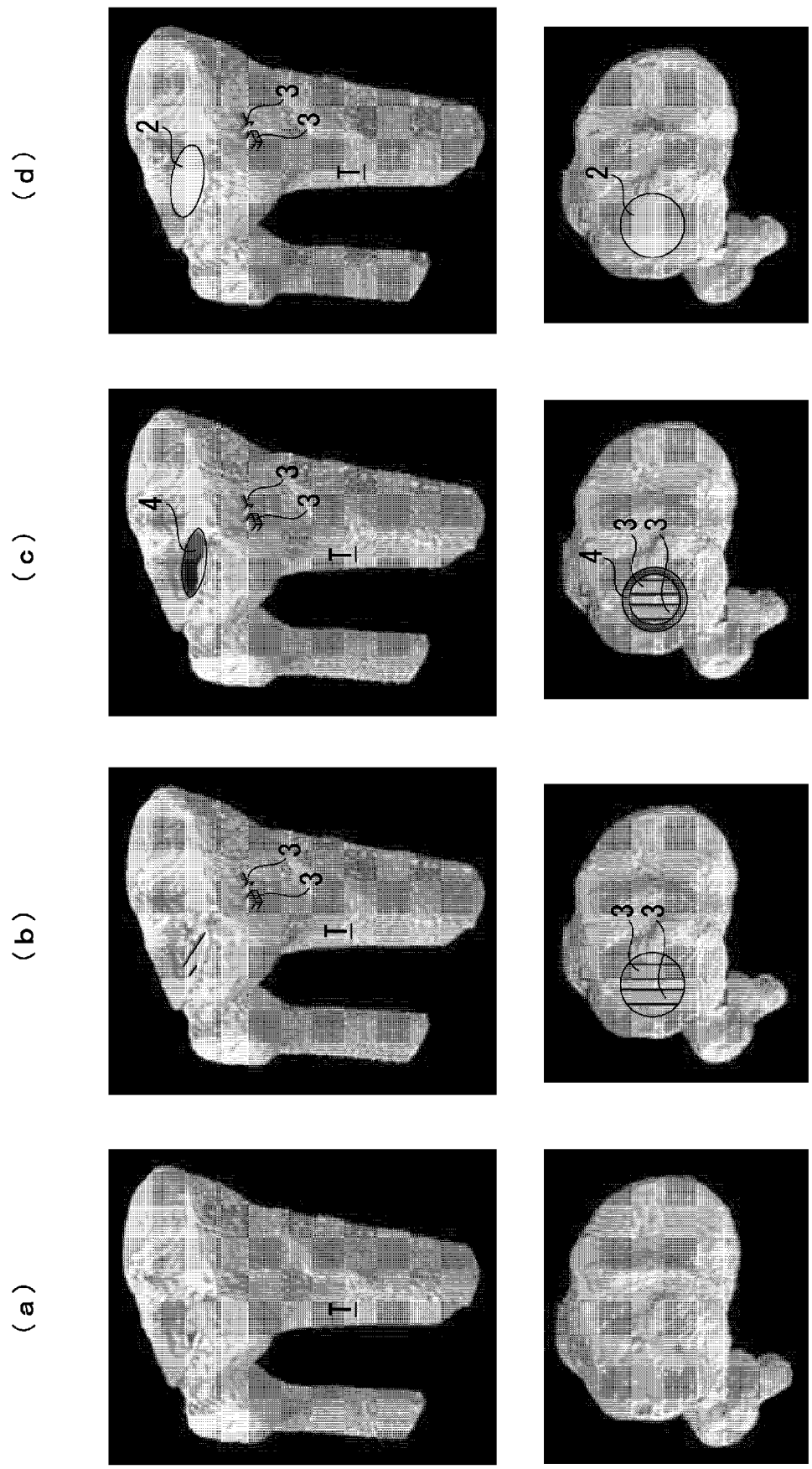
FIGS. 5(a), 5(b), 5(c), and 5(d) areperspective and plan views illustrating a surgery procedure.

FIGS. 5(a), 5(b), 5(c), and 5(d) illustrates an example of a surgery procedure. In the tibia T illustrated in FIG. 5(a), the joint surface of the lateral condyle LC is worn. First, in a portion of the tibia T, which is located underneath the joint surface of the lateral condyle LC, through holes which extend along the front-rear direction are formed by using a drill or the like. Two through holes are formed in line in the left-right direction. Subsequently, as illustrated in FIG. 5(b), the bridge members 3 are driven into the through holes. Subsequently, in a portion of the lateral condyle LC, which is located above the bridge members 3, a round hole that has a diameter corresponding a diameter of the insert member 2 is formed. Subsequently, as illustrated in FIG. 5(c), the base plate 4 is inserted into the round hole formed above the bridge members 3. Finally, as illustrated in FIG. 5(d), the insert member 2 is fitted to the upper end of the base plate 4.

As described above, the artificial knee joint 1 according to the present embodiment includes: the insert member 2 embedded in a part of the joint surface of the medial condyle MC or lateral condyle LC of the tibia T; and the bridge members 3 disposed underneath the insert member 2, and having a length that allows both ends thereof to be anchored to the cortical bone of the tibia T.

In accordance with the artificial knee joint 1 according to the present embodiment, the insert member 2 is embedded in only a part of the joint surface, whereby the surface of the insert member 2 can be matched with the height and shape of the joint surface that has remained therearound, and therefore, it is possible to reproduce the height of the original joint surface. Moreover, the height of the original joint surface is reproduced, thus making it possible to preserve the meniscus.

Moreover, in the artificial knee joint 1 according to the present embodiment, only a part of the joint portion is replaced, and therefore, the surgery is easy, surgical invasion is less, and a bleeding risk is also reduced. It is possible to preserve an anterior cruciate ligament (ACL), and when a damage is recognized in the anterior cruciate ligament, it is also possible to simultaneously rebuild the same. Further, all the ligaments can be reserved as well as the meniscus, and preservation of a deep medial collateral ligament (dMCL), which has been particularly difficult heretofore, is also possible.

The insert member 2 may be in contact with the bridge members 3. With this configuration, the insert member 2 is surely supported from below by the bridge members 3.

The insert member 2 may be in no contact with the bridge members 3. With this configuration, some play can be provided between the insert member 2 and the bridge members 3, and therefore, a destruction when a large load is applied thereto can be suppressed.

Preferably, the outer edge portion of the insert member 2, which is adjacent to the meniscus, is formed into a circular arc shape. With this configuration, interference of the insert member 2 with the meniscus is prevented, and the meniscus can be preserved.

The bridge members 3 may be arranged only along the front-rear direction. If the bridge members 3 are arranged along the left-right direction, when a large load is applied to either one of the medial condyle MC and the lateral condyle LC, it is apprehended that the other one of the medial condyle MC and the lateral condyle LC may be adversely affected through the bridge members 3.

The artificial knee joint 1 according to the present embodiment may further include the cylindrical base plate 4 disposed between the insert member 2 and the bridge members 3, and supporting the outer edge of the insert member 2. With this configuration, the insert member 2 is surely supported from below by the base plate 4 and the bridge members 3.

The base plate 4 may be in contact with the bridge members 3. With this configuration, the base plate 4 is surely supported from below by the bridge members 3.

The base plate 4 may be in no contact with the bridge members 3. With this configuration, some play can be provided between the base plate 4 and the bridge members 3, and therefore, the base plate 4 sinks, and the height of the insert member 2 can be adjusted appropriately.

An upper portion of the base plate 4 may have an inclined surface inclined with respect to the plane perpendicular to the cylinder axis thereof. With this configuration, the base plate 4 is rotated about the cylinder axis, whereby the height of the insert member 2 can be adjusted according to the height and shape of the joint surface of the actual tibia T.

Preferably, the surface of the insert member 2a embedded in the medial condyle MC of the tibia T is formed into a recessed curved surface. In usual, the original joint surface of the medial condyle MC is a recessed curved surface, and therefore, with this configuration, the surface of the insert member 2a smoothly connects to the surrounding original joint surface.

Preferably, the surface of the insert member 2b embedded in the lateral condyle LC of the tibia T is formed into a protruding curved surface. In usual, the original joint surface of the lateral condyle LC is a protruding curved surface, and therefore, with this configuration, the surface of the insert member 2b smoothly connects to the surrounding original joint surface.

The artificial knee joint 1 is not limited to the configuration of the above-described embodiments, and is not limited to the above-described functions and effects. Moreover, as a matter of course, the artificial knee joint 1 can be modified in various ways within the scope without departing from the spirit of the present invention. For example, the configuration, the method, and the like of each of the plurality of embodiments described above may be arbitrarily adopted and combined, and it is a matter of course that one or more configurations, methods, and the like according to various modification examples described below may be arbitrarily selected and adopted in the configuration, method, and the like according to the embodiments described above.

Figure 6A:
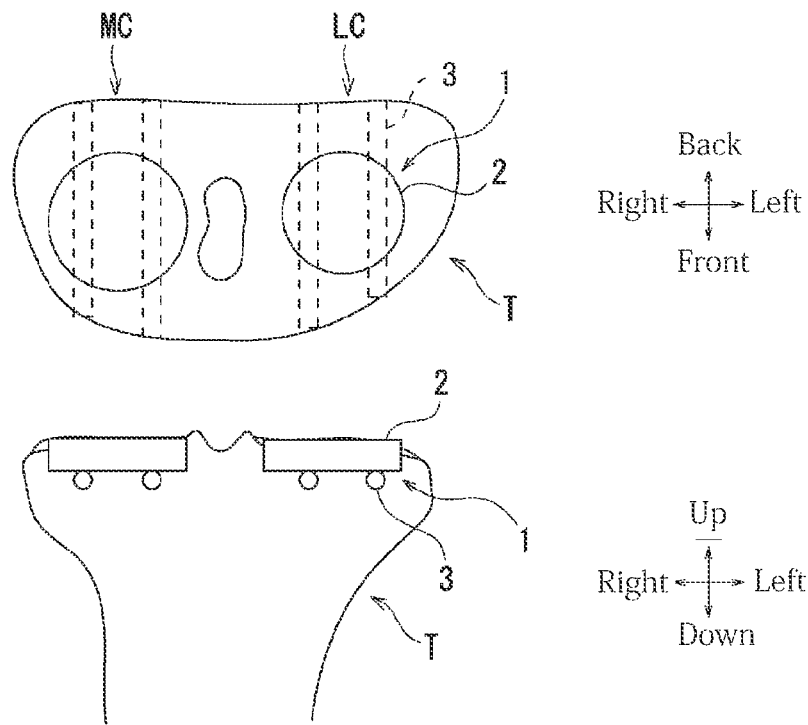
FIG. 6A is plan and front views illustrating a use state of an artificial knee joint according to another embodiment.

For example, FIG. 6A is an example in which the insert member 2 is embedded in a part of each of the joint surfaces of the medial condyle MC and the lateral condyle LC. This drawing does not illustrate the base plates 4; however, the base plates 4 may be provided, and this also applies similarly to the following drawings.

Figure 6B:
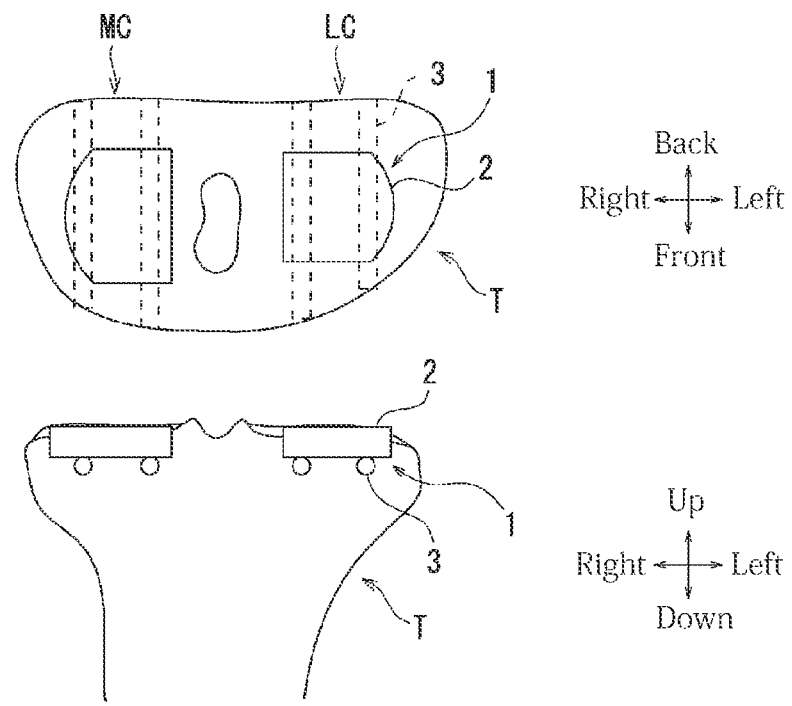
FIG. 6B is plan and front views illustrating a use state of an artificial knee joint according to another embodiment.
Figure 6C:
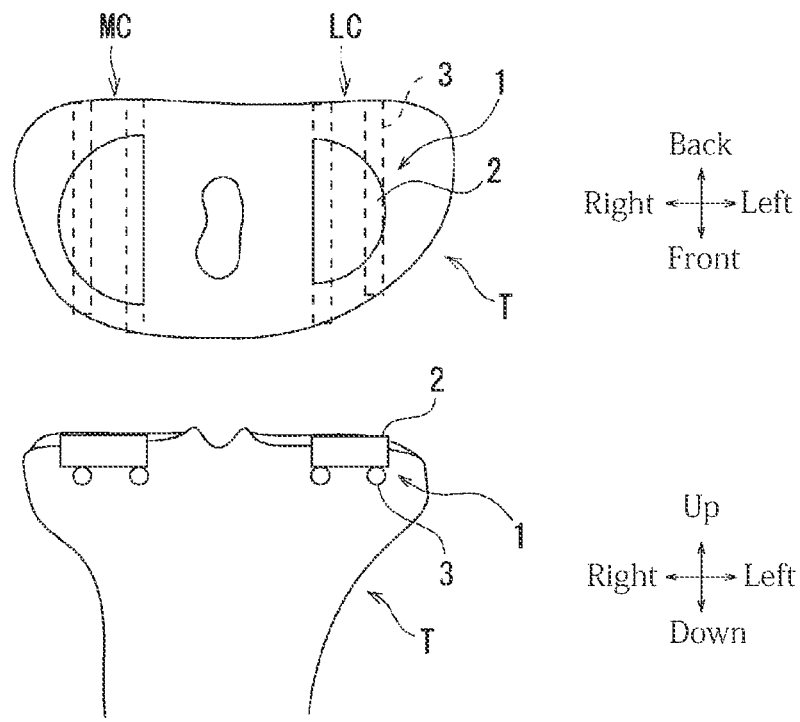
FIG. 6C is plan and front views illustrating a use state of an artificial knee joint according to another embodiment.
Figure 6D:
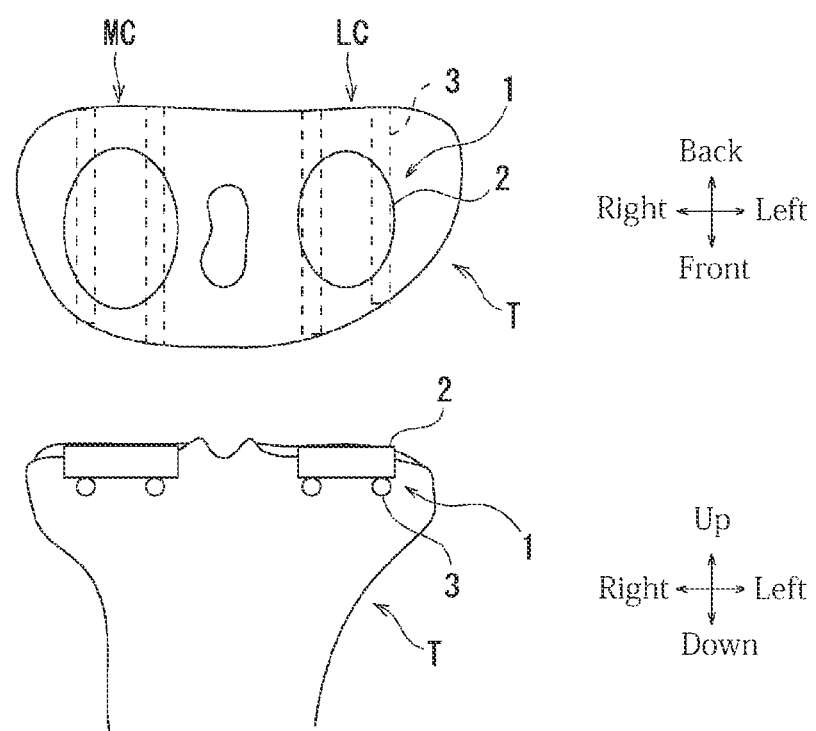
FIG. 6D is plan and front views illustrating a use state of an artificial knee joint according to another embodiment.

FIG. 6B is an example in which the insert members 2 have a D letter shape in plan view. FIG. 6C is an example in which the insert members 2 have a semicircular shape in plan view. FIG. 6D is an example in which the insert members 2 have an elliptical shape in plan view.

Figure 6E:
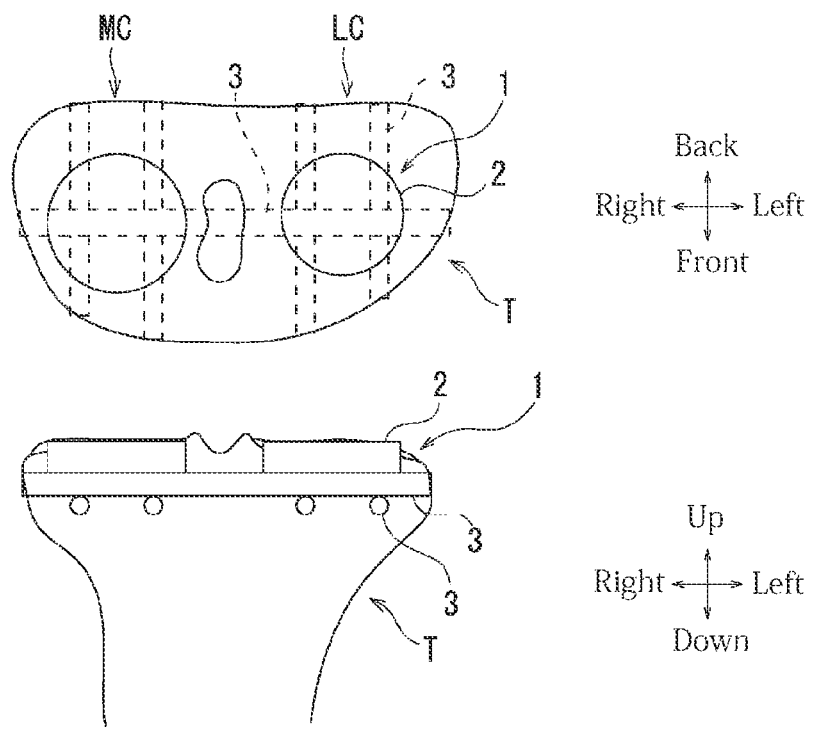
FIG. 6E is plan and front views illustrating a use state of an artificial knee joint according to another embodiment.

FIG. 6E is an example in which a bridge member 3 that extends along the left-right direction is disposed in addition to the bridge members 3 which extend along the front-rear direction.

Figure 6F:
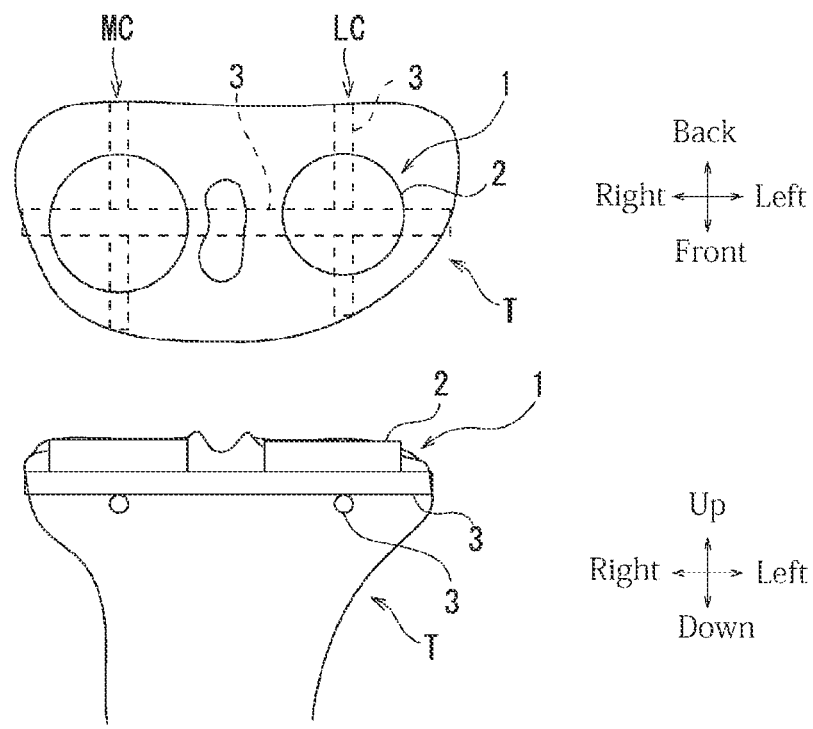
FIG. 6F is plan and front views illustrating a use state of an artificial knee joint according to another embodiment.
Figure 6G:
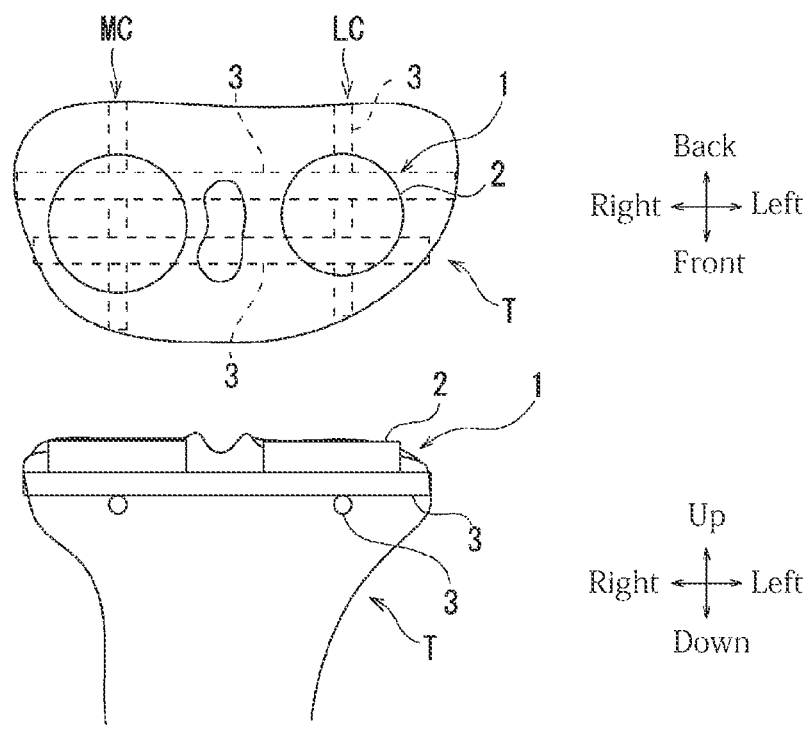
FIG. 6G is plan and front views illustrating a use state of an artificial knee joint according to another embodiment.
Figure 6H:
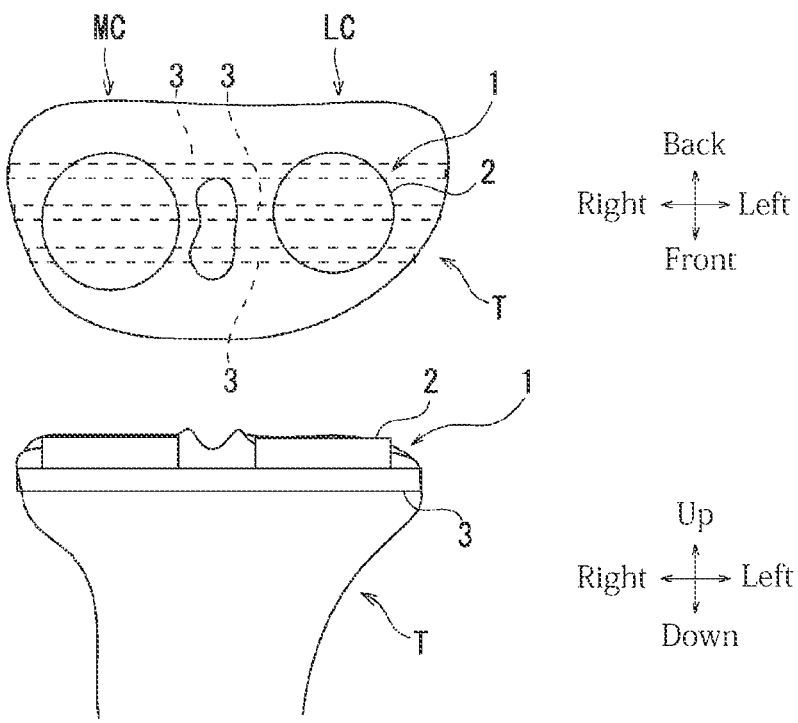
FIG. 6H is plan and front views illustrating a use state of an artificial knee joint according to another embodiment.

FIG. 6F is an example in which one bridge member 3 that extends along the front-rear direction and one bridge member 3 that extends along the left-right direction are arranged for each of the insert members 2. FIG. 6G is an example in which one bridge member 3 that extends along the front-rear direction and two bridge members 3 which extend along the left-right direction are arranged for each of the insert members 2. FIG. 6H is an example in which only three bridge members 3 which extend along the left-right direction are arranged.

Figure 7:
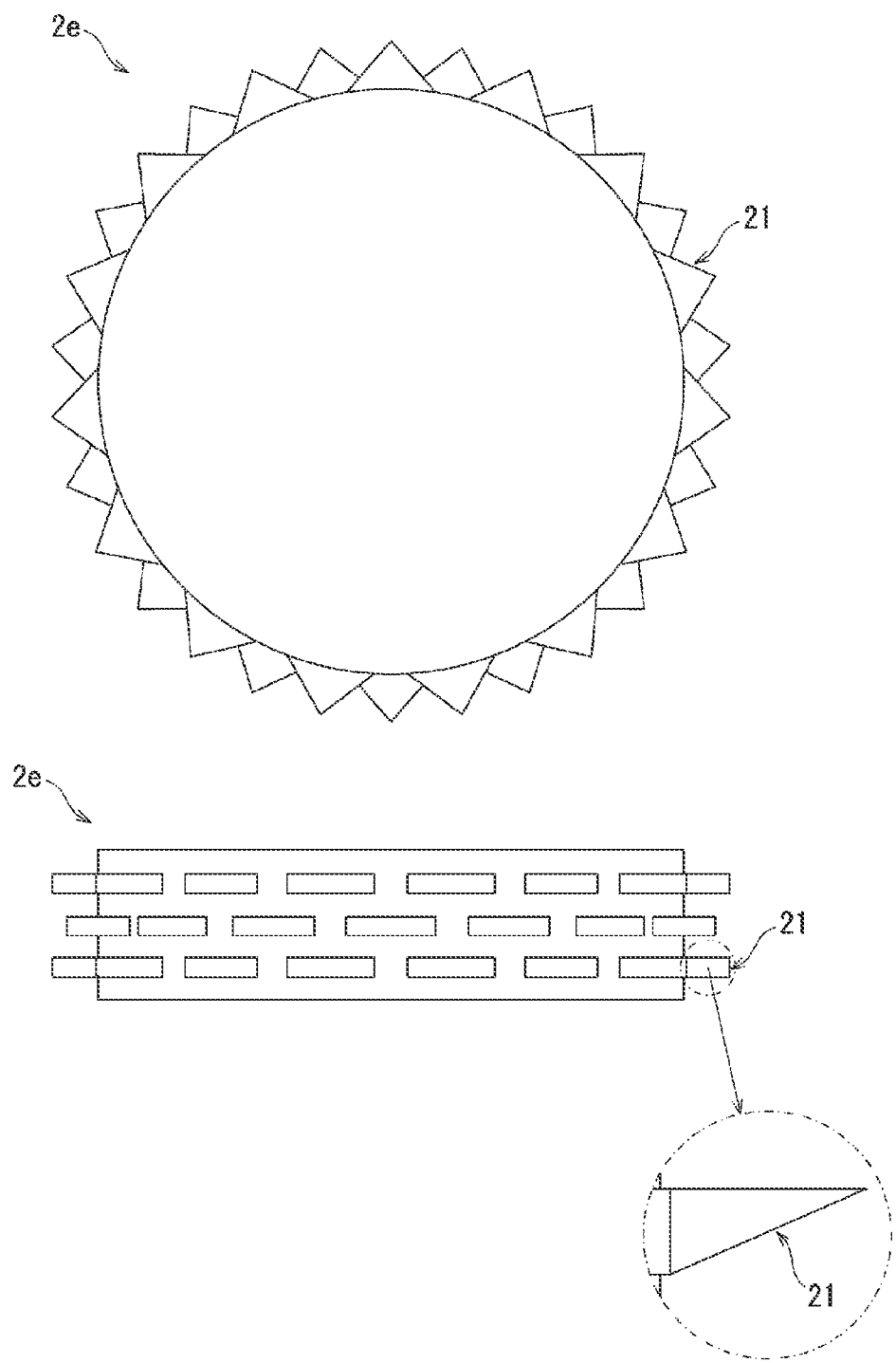
FIG. 7 is plan and side views of an insert member according to another embodiment.

FIG. 7 is plan and side views of an insert member 2e according to another embodiment. The insert member 2e is supported from below by the bridge members 3 without the base plate 4 interposed therebetween. Therefore, the insert member 2e has a disc shape without the step portion 20 formed thereon. The disc-shaped insert member 2e has an outer circumferential surface provided with protrusions 21. The protrusions 21 are intermittently provided in a circumferential direction along an outer circumferential surface of the insert member 2e. Moreover, the protrusions 21 are provided in a plurality of rows in the up-down direction. Preferably, the protrusions 21 have lower surfaces inclined upward toward tip ends thereof so as to easily drive the insert member 2e into the tibia when the insert member 2e is driven thereinto (see an enlarged view).

Further, the unicompartmental knee arthroplasty (UKA) can be adopted for the medial condyle MC, and the artificial knee joint 1 can be adopted for only the lateral condyle LC.

DESCRIPTION OF REFERENCE SIGNS

1 Artificial knee joint
2 Insert member
2a Insert member
2b Insert member
2c Insert member
2d Insert member
3 Bridge member
3a Bridge member
3b Bridge member
3c Bridge member
4 Base plate
4a Base plate
4b Base plate
4c Base plate
4d Base plate
4e Base plate
4f Base plate
4g Base plate
4h Base plate
4i Base plate
4j Base plate
4k Base plate
4m Base plate
40 Cylindrical portion
40a Opening portion
43 Bottom portion
44 Mesh portion
Fin
46 Fin
47 Fin
48 Fin
49 Thread
Recessed portion
T Tibia
MC Medial condyle
LC Lateral condyle

The invention claimed is:

1. An unicompartmental artificial knee joint comprising:
an insert member sized and configured to be embedded in only a part of a joint surface of a medial condyle or lateral condyle of a tibia;
a pair of elongated bridge members sized and configured to be disposed underneath the insert member, each elongated bridge member having a length that allows opposite ends of the bridge member to be anchored to a cortical bone of the tibia, and supporting the insert member from below; and
a cylindrical base plate disposed between the insert member and the bridge members, and supporting an outer edge of the insert member,
wherein a longitudinal axis of each bridge member is disposed parallel to a bottom surface of the insert member,
wherein the insert member has a circular shape, an elliptical shape, or a semicircular shape in plain view,
wherein a top surface of the insert member is formed into a recessed curved surface, a protruding curved surface, or a flat surface, the top surface sized and configured to articulate with a femur or femoral component,
wherein the insert member has a peripheral surface adjusted in height and shape so that the peripheral surface, when the insert member is embedded, is completely surrounded and smoothly connected to surrounding original joint surface.

2. The artificial knee joint according to claim 1, wherein the insert member is in contact with each bridge member.

3. The artificial knee joint according to claim 1, wherein the insert member is in no contact with the bridge members.

4. The artificial knee joint according to claim 1, wherein the bridge member is disposed at least along a front-rear direction of the tibia.

5. The artificial knee joint according to claim 1, wherein the base plate is in contact with each bridge member.

6. The artificial knee joint according to claim 1, wherein the base plate is in no contact with the bridge members.

7. The artificial knee joint according to claim 1, wherein an upper portion of the base plate has an inclined surface inclined with respect to a plane perpendicular to a cylinder axis.

8. The artificial knee joint according to claim 1, wherein a longitudinal axis of each bridge member is disposed at least along a left-right direction of the tibia.

* * * * *